(12) United States Patent
Nguyen et al.

(10) Patent No.: US 12,335,053 B2
(45) Date of Patent: Jun. 17, 2025

(54) SYSTEMS AND METHODS FOR MANAGING PRP NETWORKS

(71) Applicant: Rockwell Automation Technologies, Inc., Mayfield Heights, OH (US)

(72) Inventors: Julie Nguyen, Mayfield Heights, OH (US); Stephen A. Wenner, Akron, OH (US); Eric Eilberg, Rocky River, OH (US); Jessica E Forguites, Willoughby, OH (US); Mark G. Devonshire, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 931 days.

(21) Appl. No.: 17/449,598

(22) Filed: Sep. 30, 2021

(65) Prior Publication Data

US 2023/0097452 A1 Mar. 30, 2023

(51) Int. Cl.
*H04L 1/22* (2006.01)
*H04L 41/12* (2022.01)
*H04L 61/2517* (2022.01)
*H04L 101/622* (2022.01)

(52) U.S. Cl.
CPC ............... *H04L 1/22* (2013.01); *H04L 41/12* (2013.01); *H04L 61/2517* (2013.01); *H04L 2101/622* (2022.05)

(58) Field of Classification Search
None
See application file for complete search history.

(56) References Cited

U.S. PATENT DOCUMENTS 10,887,183 B1 * 1/2021 Nakagaki .......... G06F 16/90335
2019/0159032 A1 * 5/2019 Müller .............. H04L 12/40182

* cited by examiner

*Primary Examiner* — Robert M Morlan
(74) *Attorney, Agent, or Firm* — Fletcher Yoder, P.C.

(57) ABSTRACT

A method for generating a topology view of an industrial parallel redundancy protocol (PRP) network includes: detecting, by one or more processors, a plurality of nodes on the PRP network; determining, by the one or more processors, a first set of the plurality of nodes that connects to a first local area network (LAN); determining, by the one or more processors, a second set of the plurality of nodes that connects to a second LAN; determining, by the one or more processors, connections between the plurality of nodes; and generating, by the one or more processors, the topology view of the PRP network comprising a topology view of the first LAN and the second LAN according to the determined connections.

19 Claims, 7 Drawing Sheets

SYSTEMS AND METHODS FOR MANAGING PRP NETWORKS

FIELD OF THE DISCLOSURE

The present disclosure relates to systems and methods for managing Parallel Redundancy Protocol (PRP) networks, more specifically, systems and methods for providing PRP network topology, status, and indication of network problems over PRP.

BACKGROUND OF THE DISCLOSURE

PRP is an international standard protocol and widely used in modern industrial systems for providing high availability in Ethernet networks. PRP technology creates seamless redundancy by sending duplicate frames to two independent network infrastructures (e.g., LAN A and LAN B). A PRP network can have many topologies including various combinations of components connected in the two independent network infrastructures. The two independent network infrastructures can have different topologies that are comprised of different network components as well. It will be beneficial to provide visibility of a PRP network to show the PRP topologies view and status of various components formed the topologies in order to diagnose network problems over PRP and assist users to resolve the networking issues.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to a system for generation and delivery of industrial parallel redundancy protocol (PRP) management information includes a memory that stores computer-executable components and a processor, operatively coupled to the memory, that executes the computer-executable components. The computer-executable components includes a node component configured to: detect a plurality of nodes on a PRP network; determine a first set of the plurality of nodes that connects to a first local area network (LAN); and determine a second set of the plurality of nodes that connects to a second LAN. The computer-executable components also includes a topology component configured to: determine connections between the plurality of nodes; and generate a topology view of the first LAN and the second LAN according to the determined connections.

Some embodiments of the present invention relate to a method for generating a topology view of an industrial parallel redundancy protocol (PRP) network includes: detecting, by one or more processors, a plurality of nodes on the PRP network; determining, by the one or more processors, a first set of the plurality of nodes that connects to a first local area network (LAN); determining, by the one or more processors, a second set of the plurality of nodes that connects to a second LAN; determining, by the one or more processors, connections between the plurality of nodes; and generating, by the one or more processors, the topology view of the PRP network comprising a topology view of the first LAN and the second LAN according to the determined connections.

Some embodiments of the present invention relate to a non-transitory computer-readable medium having stored thereon instructions that, in response to execution, cause a system comprising a processor to perform operations for generating a topology view of an industrial parallel redundancy protocol (PRP) network. The operations include detecting a plurality of nodes on the PRP network; determining a first set of the plurality of nodes that connects to a first local area network (LAN); determining a second set of the plurality of nodes that connects to a second LAN; determining connections between the plurality of nodes; and generating the topology view of the PRP network comprising a topology view of the first LAN and the second LAN according to the determined connections.

Figure 1:
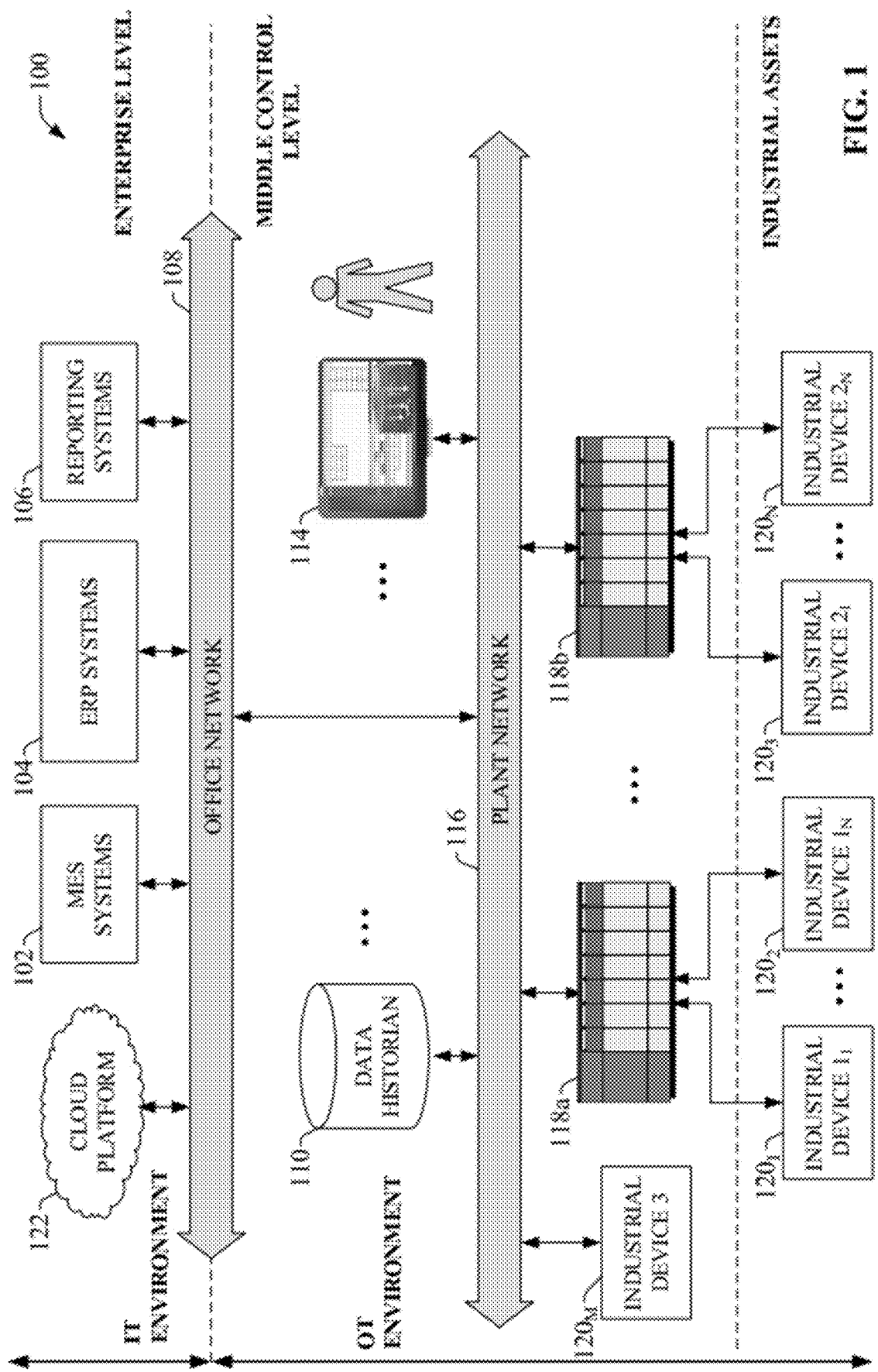
FIG. 1 shows a block diagram of an example industrial environment according to an illustrative embodiment.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets. The plant network 116 may include a PRP network according to some embodiments.

Figure 2:
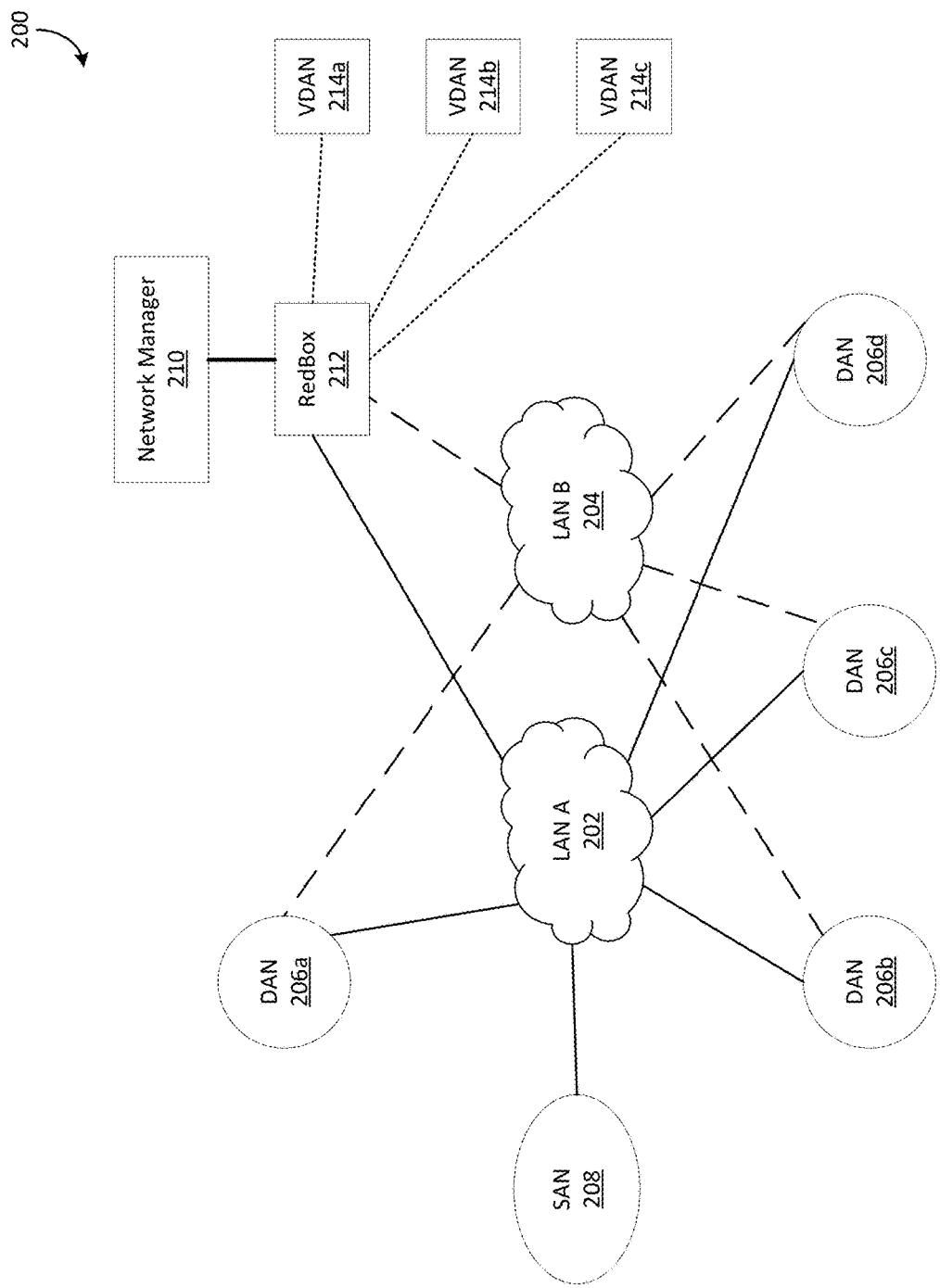
FIG. 2 shows a block diagram of a network diagram of a network of an industrial system according to an illustrative embodiment.

With reference to FIG. 2, a network diagram of a network 200 of an industrial system is shown according to an illustrative embodiment. The network 200 may be used to implement redundancy process in the industrial system used in an industrial automation environment as described herein. The industrial system includes multiple components communicatively connected as network nodes within the network 200. The network 200 utilizes parallel redundancy protocol (PRP) as defined in international standard IEC 62439-3 to connect all the network nodes for providing high networks availability. The network 200 provides seamless redundancy by transmitting duplicate frames to two independent network infrastructures (e.g., LAN A 202, LAN B 204.) The network 200 provides an example of one possible topology of the PRP network infrastructure, but note that other implementations could employ different topologies with additional and/or alternative components and network connections between the components.

In this example, the network 200 includes two independent networks: a first local area network (LAN A) 202 and a second area network (LAN B) 204. In some embodiments, LAN A 202 and LAN B 204 may have different network topologies that are comprised of different network components. In some other embodiments, LAN A 202 and LAN B 204 may have similar topologies, network speed, network latency, and hops. The network 200 includes one or more components (e.g., Ethernet/IP controllers) configured as double attached nodes (DANs) 206. Each DAN 206 is configured as an end device with PRP technology that connects to both LAN A 202 and LAN B 204. When a component is configured with PRP technology, the component includes two ports that operate in parallel and attach to LAN A and LAN B. Each DAN simultaneously sends and receives duplicate Ethernet frames through both LAN A 202 and LAN B 204 ports. The receiving node accepts whichever frame arrives first and discards the subsequent copy. If a failure occurs in one of the paths, traffic continues to flow through the other path uninterrupted with no recovery time. The network 200 further includes one or more components (e.g., HMIs) configured as single attached nodes (SANs) 208. Each SAN 208 is configured as an end device without PRP technology that connects to either LAN A 202 or LAN B 204. The SAN 208 does not have PRP redundancy. The network 200 also includes a switch (e.g., an industrial Ethernet managed switch) configured as a redundancy box (RedBox) 212. The RedBox 212 is configured with PRP technology that connects components without PRP technology to both LAN A 202 and LAN B 204. The network 200 also includes one or more components (e.g., I/O modules, drives, HMIs) configured as virtual double attached nodes (VDAN) 214. Each VDAN 214 is configured as an end device without PRP technology that connects to both LAN A 202 and LAN B 204 through the RedBox 212.

In this example topology, the DANs 206a, 206b, 206c, and 206d, the SAN 208, and the RedBox 212 are connected to LAN A 202. The DANs 206a, 206b, 206c, and 206d, and the RedBox 212 are connected to LAN B 204. The VDANs 214a, 214b, and 214c are connected to both LAN A 202 and LAN B 204 through the RedBox 212.

The industrial system includes a network manager 210 communicatively connects to the RedBox 212. The network manager 210 is configured to access both LAN A 202 and LAN B 204 through the RedBox 212. The network manager 210 is configured to provide visibility into the PRP network 200 by generating a PRP topology view and provide indication of network problems over PRP and assist users to resolve networking issues. The topology view provides users a better understanding of what areas of the network architecture are part of the PRP topology and what nodes are PRP participants. For example, the network manager 210 may discover all the nodes (e.g., nodes 206, 208, 212, and 214) in the network 200 and identify which nodes are DANS (e.g., nodes 206a, 206b, 206c, 206D), which nodes are VDANS (e.g., nodes 214a, 214b, 214c), which node is a RedBox (e.g., node 212), and which nodes are SANs. The network manager 210 may further identify LAN A 202 and LAN B 204 and identify which nodes are within LAN A 202 and which nodes are within LAN B 204. The network manager 210 may also identify all the connections among the discovered nodes.

The network manager 210 generates the PRP topology view using network data collected from the network 200 through the RedBox 212. The collected network data includes, but is not limited to node table data, switch table data, and link layer protocol data (e.g., Link Layer Discovery Protocol (LLCP) data, Cisco Discovery Protocol (CDP) data.) The node table data includes a list of nodes, a node identifier for each node, a list of MAC addresses for each port of each node, and a role for each node. Each of the list of MAC addresses is associated with a node or a switch that is connected directly or indirectly to the respective port of the identified node. In some embodiments, the node may have one port and the node table data includes the MAC address for the port. The node table may include nodes that with PRP technology and nodes without PRP technology. The role for each node indicates if a node is a SAN or a DAN/VDAN. The switch table provides per-port data including a list of switches, a switch identifier, a list of MAC addresses for each port of each identified switch. Each of the list of MAC addresses is associated with a node or a switch that is connected directly or indirectly to the respective por to the identified switch. The link layer protocol data includes a list of nodes and switches, an identifier for each node and switch, a MAC address for each port of each node or switch. The network manager 210 is configured to correlate these network data to identify each node within the network 200, identify the role (e.g., a SAN, a DAN, or a VDAN) of each node, determine connections between the nodes, and determine a topology for each of LAN A and LAN B. For example, the network manager 210 may start at a first node of a plurality of identified nodes and retrieve a first list of MAC addresses for a first port of the first node and a second list of MAC addresses for a second port of the second node. The network manager 210 may correlate the first list of the MAC addresses with other MAC addresses in the node table data and switch table data to determine a first list of nodes and/or switches that connect to the first port of the first node directly or indirectly. The network manager 210 further correlates the node or switch table data of the first list of nodes and/or switches with a first link layer protocol data associated with the first port of the first node to determine which node among the first list of nodes and/or switches connects to the first port of the first node directly. Similarly, the network manager 210 may use these correlation processes to determine a node that directly connects to the second port of the first node. In this way, the network manager 210 may determine a directly connected node for each port of each node of the plurality of nodes. When the network manager 210 determines a switch, the network manager 210 may retrieve a first port number for a first port and a second port number for the second port. The network manager 210 may determine that the port with the lower port number as LAN A port (e.g., a port connects to the LAN A,) and the port with higher port number as LAN B port (e.g., a port connects to the LAN B.) In some embodiments, the network manager 210 determine which port of a switch connects to the LAN A and which port of the switch connects to the LAN B according to user defined rules. The network manager 210 then can determine that all nodes as determined being connected directly or indirectly to the LAN A port of the switch are on the LAN A and all the nodes as determined being connected directly or indirectly to the LAN B port of the switch are on the LAN B. The network manager 210 may be also configured to display outages on the primary path to customers that indicates which nodes within the network 200 are impacted the outage. Due to the redundant nature of PRP network, this outage information is usually invisible to the end devices, because the end devices will keep working using the secondary path. However, the network manager 210 is able to provide the PRP topology, connections, and layout, which can determine a network problem and highlight the problem for user intervention and resolution.

Figure 3:
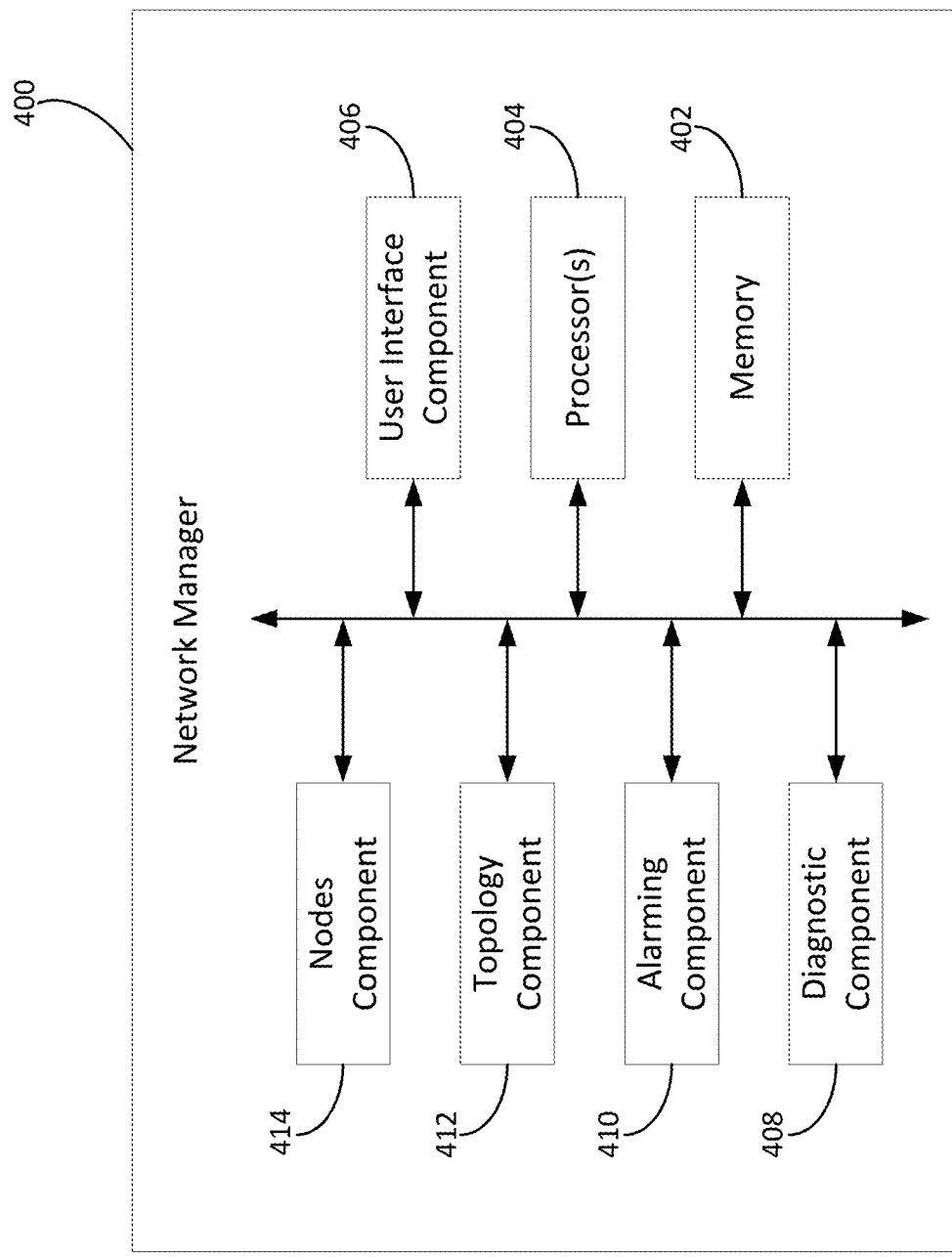
FIG. 3 shows a block diagram of an example network manager according to an illustrative embodiment.

FIG. 3 is a block diagram of an example network manager 400 according to an illustrative embodiment. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. The network manager 400 can be used in a similar way as the network managers 210 and 310 as described above.

The network manager 400 includes memory 402, one or more processors 404, a user interface component 406, a diagnostic component 408, an alarming component 410, a topology component 412, and a node component 414. In various embodiments, one or more of the memory 402, one or more processors 404, a user interface component 406, a diagnostic component 408, an alarming component 410, a topology component 412, and a node component 414 can be electrically and/or communicatively coupled to one another to perform one or more of the functions of the network manager 400. In some embodiments, components 406, 408, 410, 412, and 414 can comprise software instructions stored on memory 402 and executed by processor(s) 404. The network manager 400 may also interact with other hardware and/or software components not depicted in FIG. 3. For example, processor(s) 404 may interact with one or more external user interface devices, such as a keyboard, a mouse, a display monitor, a touchscreen, or other such interface devices.

The node component 414 is configured to dynamically detect all the nodes within the network and retrieve node table data, switch table data, and link layer protocol data from the detected nodes. The node table data includes a list of nodes, a node identifier for each node, a list of MAC addresses for each port of each node, and a role for each node. Each of the list of MAC addresses is associated with a node or a switch that is connected directly or indirectly to the respective port of the identified node. In some embodiments, the node may have one port and the node table data includes the MAC address for the port. The node table may include nodes that with PRP technology and nodes without PRP technology. The role for each node indicates if a node is a SAN or a DAN/VDAN. The switch table provides per-port data including a list of switches, a switch identifier, a list of MAC addresses for each port of each identified switch. Each of the list of MAC addresses is associated with a node or a switch that is connected directly or indirectly to the respective por to the identified switch. The link layer protocol data includes a list of nodes and switches, an identifier for each node and switch, a MAC address for each port of each node or switch.

The node component 414 is further configured to determine connections between all the nodes. The node component 414 starts at a first node of all the identified nodes and retrieve a first list of MAC addresses for a first port of the first node and a second list of MAC addresses for a second port of the second node. The node component 414 may correlate the first list of the MAC addresses with other MAC addresses in the node table data and switch table data to determine a first list of nodes and/or switches that connect to the first port of the first node directly or indirectly. The node component 414 further correlates the node or switch table data of the first list of nodes and/or switches with a first link layer protocol data associated with the first port of the first node to determine which node among the first list of nodes and/or switches connects to the first port of the first node directly. Similarly, the node component 414 may use these correlation processes to determine a node that directly connects to the second port of the first node. In this way, the node component 414 may determine a directly connected node for each port of each node of the plurality of nodes which further forms an overall topology of the network.

Figure 6:
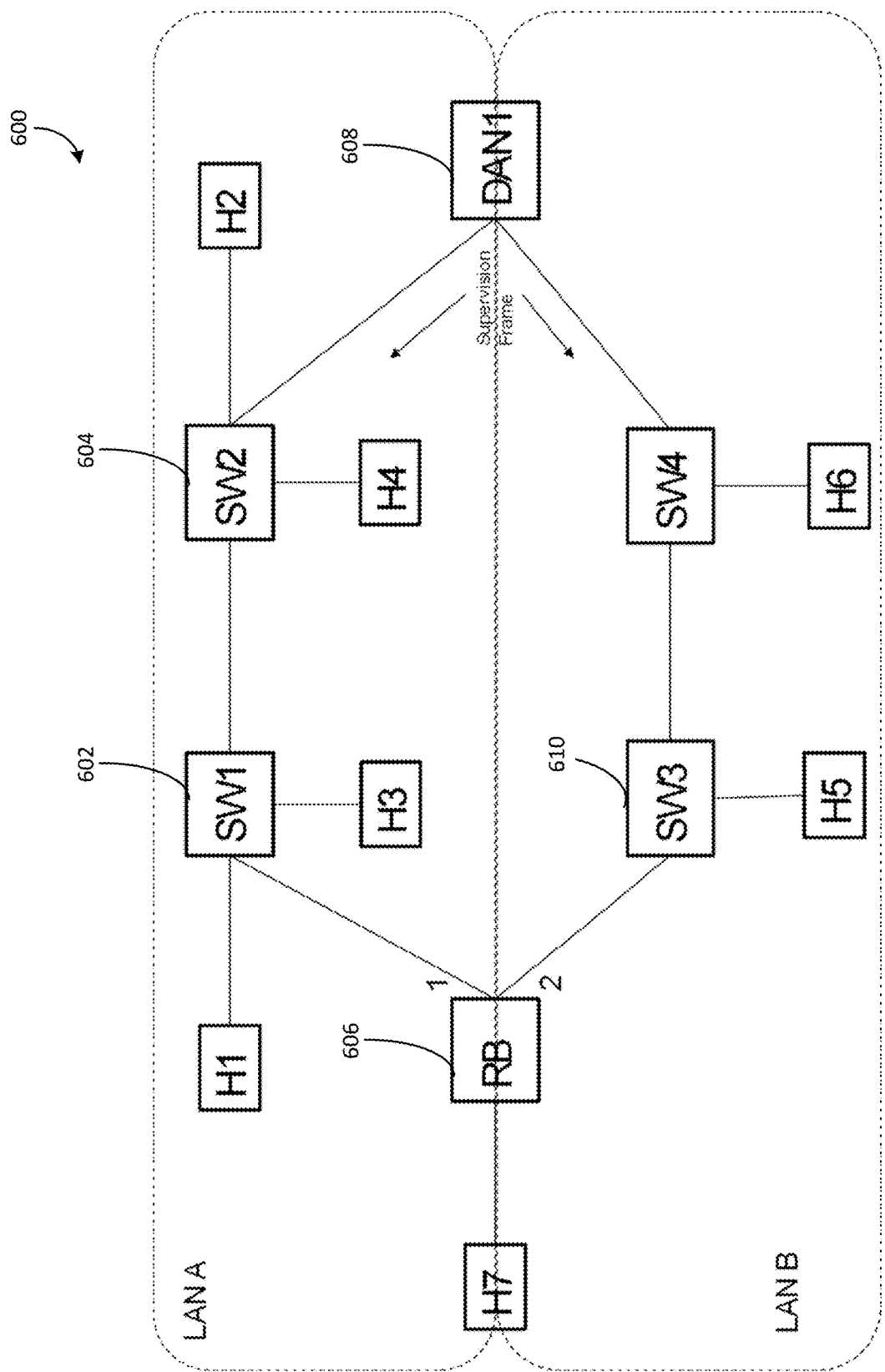
FIG. 6 shows an example topology view generated by the network manager of FIG. 3 according to an illustrative embodiment.

The topology component 412 is configured to receive the node table data, the switch port data, and the link layer protocol data from the node component 414. The topology component 412 is configured to determine which nodes and/or switches are on the LAN A and which nodes and/or switches are on the LAN B and generate a topology view for the LAN A and a topology view for LAN B. The topology component 412 is configured to determine one or more switches and retrieve a first port number for a first port and a second port number for the second port for each switch. The topology component 412 may determine that the port with the lower port number as LAN A port (e.g., a port connects to the LAN A,) and the port with higher port number as LAN B port (e.g., a port connects to the LAN B.) In some embodiments, the topology component 412 determines which port of a switch connects to the LAN A and which port of the switch connects to the LAN B according to user defined rules. The topology component 412 then can determine that all nodes as determined being connected directly or indirectly to the LAN A port of the switch are on the LAN A and all the nodes as determined being connected directly or indirectly to the LAN B port of the switch are on the LAN B. An example topology view generated by the topology component 412 is shown in FIG. 6 according to an illustrative embodiment. The topology view 600 presents all the nodes within a PRP network and the connections between the nodes. The topology view 600 also shows the parallel LAN A and LAN B, as well as what nodes that are on the LAN A and what nodes that are on the LAN B, and what nodes that are on both LAN A and LAN B. As shown in FIG. 6, the RedBox 606 has a first port 1 and a second port 2. The port 1 connects to a switch 602 in LAN A. The port 2 connects to a switch 610 in LAN B and configured to transmit supervision frames. A DAN 608 is also connected to both LAN A and LAN B and configured to transmit supervision frames to both LAN A and LAN B. The switch 601 and the switch 604 do not need to be PRP enabled switches because the topology component 412 is able to determine connections between all the nodes with or without PRP technology.

The alarming component 410 is configured to monitor capability of the PRP network and monitor the operations of each port of a RedBox. The alarming component 410 is configured to generate an alarm or report indicating there is a problem with the PRP network or a specific problem with the detected port when any port on any node in the network is not operating as expected. The alarming component 410 is configured to generate the alarm or report regarding the problem on the port even when the communication over the PRP network is working as expected. If a number of duplicate PRP packets are not received by the RedBox as expected, the alarming component 410 is configured to generate an alarm indicating a problematic link in the network topology view and there is a problem with the PRP network. If there is an issue with a RedBox that impacts connectivity to VDANs, the alarming component 410 is configured to generate an alarm indicating that those VDANs are in the impacted devices section with a description (e.g., "This device is experiencing connectivity loss to both LANs.") The alarming copoint 410 may be configured to generate a status report indicating operating status of each node and each topology. For example, a status report of LAN A and LAN B may include an "OK" status or "BAD" status. The "OK" status may be generated and reported when all infrastructure switches and PRP nodes within the PRP network are communicating, there are no missing duplicate packets, and both ports of all DANs are operating, etc. The "BAD" status may be generated and reported when one or more infrastructure switches and PRP nodes are not communicating, there are missing duplicate packets, warning counts are increasing, or DAN ports are not operating as expected, etc.

The alarming component 410 may receive instructions from the user to enable/disable, and configure a level of severity. For example, the alarming component 410 can receive instructions of how quickly PRP related alarms or statuses should be generated and presented to the users. The alarms and/or report generated by the alarming component 410 can be in any suitable format that can inform the users of the problems, such as highlighted area on the topology view, text messages, alarm signs, etc.

The diagnostic component 408 is configured to retrieve diagnostic information from the RedBox (e.g., an Ethernet enabled industrial distribution switch), DANs, and non-PRP data and counters from SANs/non PRP devices. The diagnostics component 408 is configured to generate a diagnostics chart including all the diagnostic information of a Red Box. An example diagnostics chart for RedBox is shown as follows:

|  | Prot A | Port B |
|---|---|---|
| Network Status | Fault or OK | Fault or OK |
| Network Fault Count | (Value) | (Value) |
| Transmit Count | (Value) | (Value) |
| Receive Count | (Value) | (Value) |
| Wrong LAN Count | (Value) | (Value) |
| Unique Entry Count | (Value) | (Value) |
| Duplicate Entry Count | (Value) | (Value) |
| Multiple Entry Count | (Value) | (Value) |

The description of each status is listed below:

| Field | Description |
|---|---|
| Network Status | Displays the status of the port: Fault (Network is inactive due to a current fault) OK (Network is active) |
| Network Fault Count | Displays the number of times the Network Status parameter has shown a Fault since the last Reset Counters operation or since the last power cycle. |
| Transmit Count | Displays the number of PRP-tagged frames that are transmitted since the last Reset Counters operation or since the last power cycle. |
| Receive Count | Displays the number of PRP-tagged frames that are received since the last Reset Counters operation or since the last power cycle. |
| Wrong LAN Count | Displays the number of PRP-tagged frames that are received on the wrong LAN since the last Reset Counters operation or since the last power cycle. |
| Unique Entry Count | Displays the number of PRP-tagged frames that are received on one LAN, but not received on the other LAN, since the last Reset Counters operation, or since the last power cycle. |
| Duplicate Entry Count | Displays the number of PRP-tagged frames received that were already received on another LAN since the last Reset Counters operation or since the last power cycle. This count increments during normal operation, and is not an indication of a fault. |
| Multiple Entry Count | Displays the number of PRP-tagged frames for which multiple duplicates were received on each LAN since the last Reset Counters operation, or since the last power cycle. |

Figure 4:
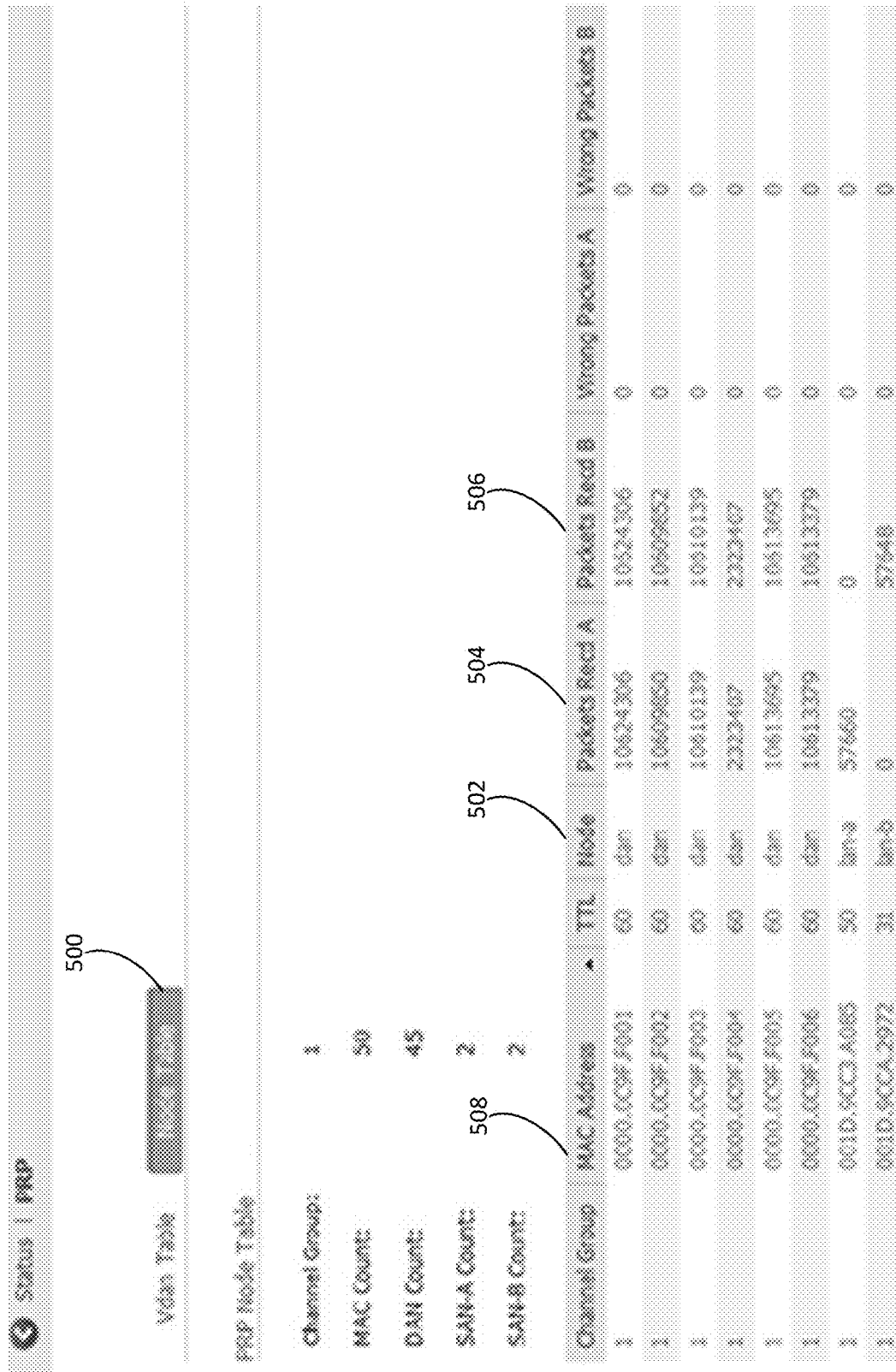
FIG. 4 shows an example user interface displaying a node table according to an illustrative embodiment.
Figure 5:
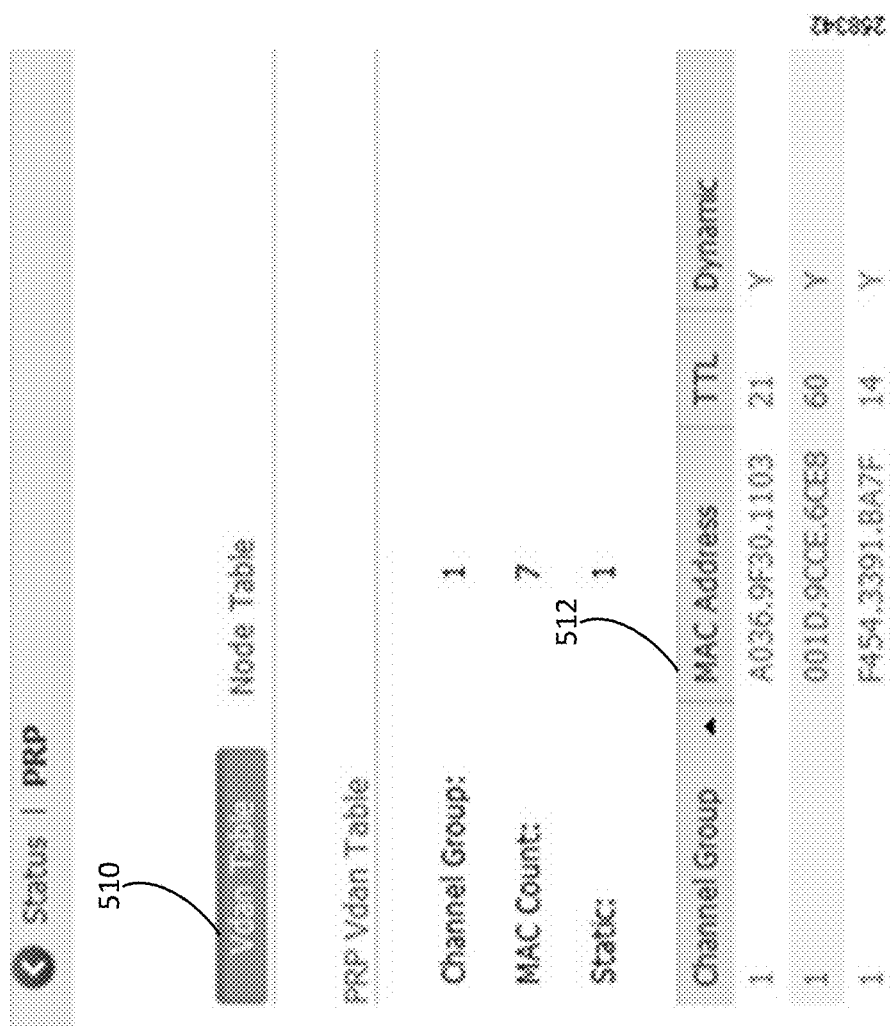
FIG. 5 shows an example user interface displaying a VDAN table according to an illustrative embodiment.

From the topology view, a user can select a switch to view diagnostics information and network mode of the select switch. The network mode may indicate whether the switch is set for PRP mode. The diagnostic component 408 is configured to generate a node table including diagnostics information and node information of all the nodes and a VDAN table including diagnostics information and node information of all the VDANs. An example node table 500 is shown in FIG. 4. The node table 500 lists all the nodes on the PRP network and shows the MAC address 508 of each node. The node table also shows the role of each node on the PRP network as shown in column 'Node' 502. In addition, the node table 500 shows packets received on LAN A in column 'Packets Recd A' 504 and packet received on LAN B 'Packet Recd B' 506 for each node as shown in FIG. 4. If there is a significant difference between the packets received on LAN A and LAN B, the diagnostics component 408 may determine there is a problem in one of the LANs and notify the user for further troubleshooting. If there are no packets received on one of the LAN A or LAN B, the diagnostic component 408 may determine that there is a problem on the identified LAN and notify the user of the problem. An example VDAN table 510 is shown in FIG. 5. The VDAN table 510 lists all the VDANs on the PRP network and presents the MAC address 512 of each VDAN.

The user interface component 406 is configured to receive user requests and selections and present the requested diagnostics information and topology view. For example, the user interface component 406 is configured to present the node table 500 generated by the diagnostic component 408 to the users as shown in FIG. 4 and present the VDAN table 510 generated by the diagnostic component 408 to the users as shown in FIG. 5.

Figure 7:
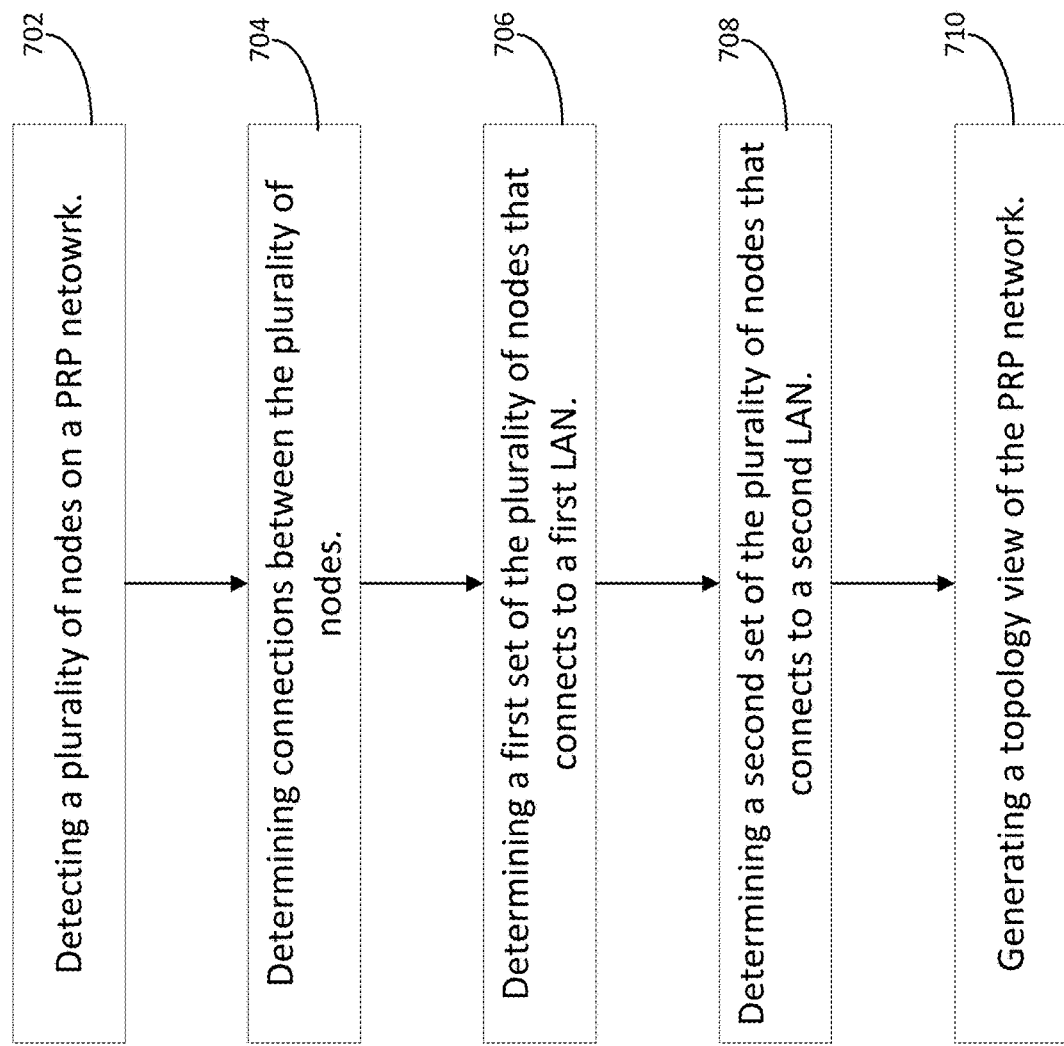
FIG. 7 shows a process for dynamically generating a topology view of a PRP network according to one or more embodiments.

FIG. 7 is a flowchart of a process for dynamically generating a topology view of a PRP network according to one or more embodiments. At operation 702, a plurality of nodes on a PRP network are detected by an industrial system. The system continually monitors the detected nodes and continuously detects new nodes that are added to the PRP network. In this way, any changes of the nodes (e.g., addition or removal) can be detected in real-time. In some embodiments, the system retrieves network data including various information for each node and switch within the network. The network data includes node table data, switch table data, and link layer protocol data from the detected nodes. The node table data includes a list of nodes, a node identifier for each node, a list of MAC addresses for each port of each node, and a role for each node. Each of the list of MAC addresses is associated with a node or a switch that is connected directly or indirectly to the respective port of the identified node. In some embodiments, the node may have one port and the node table data includes the MAC address for the port. The node table may include nodes that with PRP technology and nodes without PRP technology. The role for each node indicates if a node is a SAN or a DAN/VDAN. The switch table provides per-port data including a list of switches, a switch identifier, a list of MAC addresses for each port of each identified switch. Each of the list of MAC addresses is associated with a node or a switch that is connected directly or indirectly to the respective por to the identified switch. The link layer protocol data includes a list of nodes and switches, an identifier for each node and switch, a MAC address for each port of each node or switch.

At operation 704, the system determines connections between the plurality of nodes. The system can determine connections between the plurality of nodes using the node table data, the switch MAC address per-port data, and the link layer protocol data. For example, the system may start at a first node of a plurality of identified nodes and retrieve a first list of MAC addresses for a first port of the first node and a second list of MAC addresses for a second port of the second node. The system may correlate the first list of the MAC addresses with other MAC addresses in the node table data and switch table data to determine a first list of nodes and/or switches that connect to the first port of the first node directly or indirectly. The system further correlates the node or switch table data of the first list of nodes and/or switches with a first link layer protocol data associated with the first port of the first node to determine which node among the first list of nodes and/or switches connects to the first port of the first node directly. Similarly, the system may use these correlation processes to determine a node that directly connects to the second port of the first node. In this way, the system may determine a directly connected node for each port of each node of the plurality of nodes.

At operation 706, a first set of nodes are determined as nodes within a first LAN. At operation 708, a second set of nodes are determined as nodes within a second LAN. The system can determine which nodes are on the first LAN or the second LAN using the node table data, the switch MAC address per-port data, and the link layer protocol data. For example, the When the system determines a switch, the system may retrieve a first port number for a first port and a second port number for the second port. The system may determine that the port with the lower port number as LAN A port (e.g., a port connects to the LAN A,) and the port with higher port number as LAN B port (e.g., a port connects to the LAN B.) In some embodiments, the system 210 determine which port of a switch connects to the LAN A and which port of the switch connects to the LAN B according to user defined rules. The system then can determine that all nodes as determined being connected directly or indirectly to the LAN A port of the switch are on the LAN A and all the nodes as determined being connected directly or indirectly to the LAN B port of the switch are on the LAN B. At operation 710, the system generates a topology view of the PRP network showing the detected nodes, the determined connections, LAN A, and LAN B. In some embodiments, the topology view also indicates errors of the network. In some embodiments, the topology view is user interactive such that when a user select LAN A, the topology view is presented with a highlighted LAN A view.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generation and delivery of industrial parallel redundancy protocol (PRP) management information, comprising:
    a memory that stores computer-executable components; and
    a processor, operatively coupled to the memory, that executes the computer-executable components, the computer-executable components comprising:
        a node component configured to:
            detect a plurality of nodes on a PRP network, wherein the plurality of nodes comprises a switch, wherein the switch is configured with PRP technology and comprises:
                a first port connected to a first local area network (LAN); and
                a second port connected to a second LAN;
                wherein the switch is configured to connect one or more components without PRP technology to the first LAN, the second LAN, or both; and
            determine one or more connections between the plurality of nodes;
        a topology component configured to:
            determine a first set of the plurality of nodes that connects to the first LAN;
            determine a second set of the plurality of nodes that connects to the second LAN; and
            generate a topology map of the first LAN and the second LAN according to the determined connections, wherein the topology map presents the plurality of nodes within the PRP network and the determined connections between the plurality of nodes, the first LAN, the second LAN, the one or more components, or a combination thereof.

2. They system of claim 1, wherein the switch operates as a redundancy box within the PRP network.

3. The system of claim 1, wherein the node component is configured to retrieve node table data, switch port data, and link layer protocol data.

4. The system of claim 3, wherein the node component is configured to determine the first set of the plurality of nodes using the node table data, the switch port data, and the link layer protocol data.

5. The system of claim 4, wherein the node component is configured to determine, for the first port of the switch, the first set of nodes that is connected to the first port by correlating a MAC address of each node of the first set of nodes with a MAC address of the first port.

6. The system of claim 5, wherein the node component is configured to determine, for the second port of the switch, the second set of nodes that is connected to the second port by correlating a MAC address of each node of the second set of nodes with a MAC address of the second port.

7. The system of claim 6, wherein the node component is configured to determine a first port number for the first port and a second port number for the second port, and determine that one of the first port and the second port, which has a lower port number, as being connected to the first LAN, and the other of the first port and the second port as being connected to the second LAN.

8. The system of claim 7, wherein the node component is configured to determine that a third set of nodes that are connected to the port associated with the first LAN belongs to the first set of nodes.

9. The system of claim 8, wherein the node component is configured to determine that a fourth set of nodes that are connected to the port associated with the second LAN belongs to the second set of nodes.

10. A method for generating a topology map of an industrial parallel redundancy protocol (PRP) network, comprising:
    detecting, by one or more processors, a plurality of nodes on the PRP network, wherein the plurality of nodes comprises a switch, wherein the switch is configured with PRP technology and comprises:
        a first port connected to a first local area network (LAN); and
        a second port connected to a second LAN;
        wherein the switch is configured to connect one or more components without PRP technology to the first LAN, the second LAN, or both; and
    determining, by the one or more processors, a first set of the plurality of nodes that connects to the first LAN;
    determining, by the one or more processors, a second set of the plurality of nodes that connects to the second LAN;
    determining, by the one or more processors, connections between the plurality of nodes; and
    generating, by the one or more processors, the topology map of the PRP network comprising a topology map of the first LAN and the second LAN according to the determined connections, wherein the topology map presents the plurality of nodes within the PRP network and the determined connections between the plurality of nodes, the first LAN, the second LAN, the one or more components, or a combination thereof.

11. The method of claim 10, further comprising retrieving, by the one or more processors, node table data, switch port data, and link layer protocol data.

12. The method of claim 11, further comprising determining, by the one or more processors, the first set of the plurality of nodes using the node table data, the switch port data, and the link layer protocol data.

13. The method of claim 12, further comprising determining, by the one or more processors, for the first port of the switch, the first set of nodes that is connected to the first port by correlating a MAC address of each node of the first set of nodes with a MAC address of the first port.

14. The method of claim 13, further comprising determining, by the one or more processors, for the second port of the switch, the second set of nodes that is connected to the second port by correlating a MAC address of each node of the second set of nodes with a MAC address of the second port.

15. The method of claim 14, further comprising determining, by the one or more processors, a first port number for the first port and a second port number for the second port, and determining that one of the first port and the second port which has a lower port number as being connected to the first LAN, and the other of the first port and the second port as being connected to the second LAN.

16. The method of claim 15, further comprising determining, by the one or more processors, that a third set of nodes that are connected to the port associated with the first LAN belongs to the first set of nodes.

17. The method of claim 16, further comprising determining, by the one or more processors, that a fourth set of nodes that are connected to the port associated with the second LAN belongs to the second set of nodes.

18. A non-transitory computer-readable medium having stored thereon instructions that, in response to execution, cause a system comprising a processor to perform operations for generating a topology map of an industrial parallel redundancy protocol (PRP) network, the operations comprising:

detecting a plurality of nodes on the PRP network, wherein the plurality of nodes comprises a switch, wherein the switch is configured with PRP technology and comprises:
    a first port connected to a first local area network (LAN); and
    a second port connected to a second LAN;
    wherein the switch is configured to connect one or more components without PRP technology to the first LAN, the second LAN, or both; and
  determining a first set of the plurality of nodes that connects to the first LAN;
  determining a second set of the plurality of nodes that connects to the second LAN;
  determining connections between the plurality of nodes; and
  generating the topology map of the PRP network comprising a topology map of the first LAN and the second LAN according to the determined connections, wherein the topology map presents the plurality of nodes within the PRP network and the determined connections between the plurality of nodes, the first LAN, the second LAN, the one or more components, or a combination thereof.

19. The non-transitory computer-readable medium of claim 18, further comprising:
  retrieving node table data, switch port data, and link layer protocol data; and
  determining the first set and the second set of the plurality of nodes using the node table data, the switch port data, and the link layer protocol data.

* * * * *